US007010425B2

(12) United States Patent
Gray et al.

(10) Patent No.: US 7,010,425 B2
(45) Date of Patent: Mar. 7, 2006

(54) PATH PLANNER AND A METHOD FOR PLANNING A PATH OF A WORK VEHICLE

(75) Inventors: Sarah Ann Gray, Providence, UT (US); Shane Lynn Hansen, Smithfield, UT (US); Nicholas Simon Flann, Smithfield, UT (US)

(73) Assignee: Deere & Company, Moline, IL (US)

( * ) Notice: Subject to any disclaimer, the term of this patent is extended or adjusted under 35 U.S.C. 154(b) by 153 days.

(21) Appl. No.: 10/403,681

(22) Filed: Mar. 31, 2003

(65) Prior Publication Data

US 2005/0075785 A1 Apr. 7, 2005

(51) Int. Cl.
*G08G 1/123* (2006.01)

(52) U.S. Cl. ........................... 701/202; 701/25; 701/50; 701/209; 56/10.2 A; 172/2

(58) Field of Classification Search .................. 701/23, 701/25, 26, 50, 202, 209; 56/10.2 A; 172/2
See application file for complete search history.

(56) References Cited

U.S. PATENT DOCUMENTS 5,528,888 A * 6/1996 Miyamoto et al. ........ 56/10.2 F
5,648,901 A 7/1997 Gudat et al. .......... 364/424.027
5,684,476 A * 11/1997 Anderson ................... 340/988
5,751,576 A * 5/1998 Monson ....................... 700/83
5,955,973 A * 9/1999 Anderson ................... 340/988
5,974,347 A 10/1999 Nelson ........................ 701/22
5,978,723 A 11/1999 Hale et al. .................... 701/50
6,088,644 A * 7/2000 Brandt et al. ................. 701/50
6,128,574 A * 10/2000 Diekhans .................... 701/209
6,141,614 A * 10/2000 Janzen et al. ................. 701/50
6,236,924 B1 * 5/2001 Motz et al. ................... 701/50
6,336,051 B1 * 1/2002 Pangels et al. ............... 700/50
6,385,515 B1 5/2002 Dickson et al. ............... 701/28
6,445,983 B1 9/2002 Dickson et al. ............... 701/23
2004/0068352 A1 * 4/2004 Anderson .................... 701/25

OTHER PUBLICATIONS

Makino et al., "Development of a Motion Planning System for an Agricultural Mobile Robot", SICE Jul. 1999, pp. 959–962.*
"Computer Generation of Efficient Farm Field Courses", a thesis submitted to the Faculty of Graduate Studies and Research In Partial Fulfillment of the requirements for the degree of Electrical Engineering, Faculty of Engineering, University of Regina, By Gin Liu.
Gray, Sarah A., Planning and Replanning Events for Autonomous Orchard Tractors [online], 2001 [retrieved on Mar. 17, 2003]. Retrieved from the Internet:>URL: http://www.autonomoussolutions.com/press.html≦.
Gunderson, R.W., Torrie, M.W., Flann, N.S., Neale, C.M.U., Baker, D.J., GIS and the Computer–Controlled Farm [online], Jul. 2000. Retrieved from the Internet >URL: http://www.autonomoussolutions.com/press.html≦.
Gray, Sarah, Hansen, Shane, and Flann, Nick, Dynamic Replanning for Multiple Unmanned Ground Vehicles Using the Jaugs Architecture [online], Aug. 17, 2002 [retrieved on Mar. 17, 2003]. Retrieved from the Internet >URL: http://www.autonomoussolutions.com/press.html.
Gray, Sarah, What is Path Planning [online], Aug. 17, 2002 [retrieved on Mar. 17, 2003]. Retrieved from the Internet >URL: http://www.autonomoussolutions.com/press.html.

* cited by examiner

*Primary Examiner*—Michael J. Zanelli
*Assistant Examiner*—Eric M. Gibson

(57) ABSTRACT

A method for planning a path for a vehicle comprises creating a travel row transparency over a mapped area. The travel row transparency comprises one or more travel rows are split into travel row sections defined by intersecting the travel row with a map object (e.g., a boundary of mapped area). Partition nodes are generated from the travel row sections. The partition nodes or partition edges are linked together to form a potential drivable path consistent with user input and vehicular constrains. An efficient ordering of the partition nodes are determined consistent with the user input. A path is generated by looping through the ordered partition nodes in the determined efficient order.

29 Claims, 7 Drawing Sheets

PATH PLANNER AND A METHOD FOR PLANNING A PATH OF A WORK VEHICLE

FIELD OF THE INVENTION

This invention relates to a path planner and a method for planning a path of a work vehicle, such as a mower.

BACKGROUND OF THE INVENTION

An operator of a work vehicle may be exposed to chemicals, fertilizers, herbicides, insecticides, dust, allergens, exhaust fumes, environmental conditions, slopes, low-hanging branches, and other hazards or conditions that might be harmful or irritating to the operator. Further, an operator may not be able to achieve precise row alignment of adjacent rows because of the limited perspective of a human operator from a work vehicle or other factors. The misalignment of rows may lead to excessive or inconsistent row overlap between adjacent rows, wasted fuel, and poor aesthetic appearance of the mowed area or processed vegetation. Thus, a need exists for supporting the planning of a precise path of a work vehicle to facilitate unmanned operation of the work vehicle for mowing, distributing fertilizer, distributing herbicides, performing agricultural work or performing other work operations.

SUMMARY OF THE INVENTION

A path planner and a method for planning a path for a vehicle comprises creating a travel row transparency over a mapped area. The travel row transparency comprises one or more travel rows. The travel rows are split into travel row sections defined by intersecting the travel row with a map object (e.g., a boundary of mapped area). Partition nodes from the travel row sections are generated. The partition nodes are linked together to form potential drivable path portions (e.g., edges) or a visibility graph consistent with user input and vehicular constraints. An efficient order of the partition nodes or drivable path portions are determined consistent with the user input. A path is generated by looping through the ordered partition nodes and connecting partition nodes in the determined efficient order.

DESCRIPTION OF THE PREFERRED EMBODIMENT

The mapped area refers to a work area of the vehicle, whereas the map object refers to a desired portion of the mapped area to be mowed, sprayed, harvested, treated, covered, processed or otherwise traversed to accomplish a task. The boundaries of the mapped area and the boundaries map object may be defined to be coextensive with each other, partially contiguous with each other or noncontiguous with each other.

Figure 1:
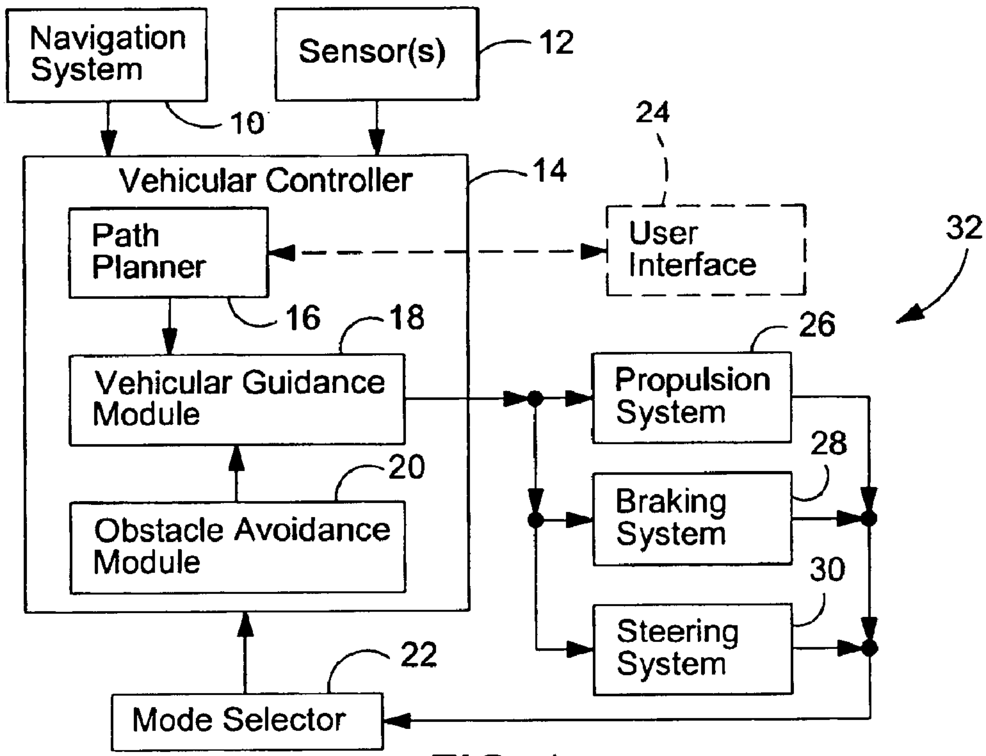
FIG. 1 is a block diagram of a vehicular control system that may incorporate or support a path planning method of this invention.

In accordance with one embodiment of the invention, FIG. 1 shows a block diagram of a system for controlling a vehicle, such as a mower, a stadium mower or another work vehicle. A vehicular controller 14 is coupled to a navigation system 10 and one or more sensors 12. The vehicular controller 14 is associated with a mode selector 22 for selection of one or more modes of operation of the vehicle. The vehicular controller 14 may communicate with a propulsion system 26, a braking system 28 or a steering system 30.

The navigation system 10 obtains location data (e.g., geographic position or geographic coordinates) of the vehicle with respect to a work area for the vehicle. The navigation system 10 may comprise a Global Positioning System (GPS) receiver with differential correction, a laser navigation system that interacts with several active transmitting beacons or passive reflective beacons at corresponding known, fixed locations, or a radio frequency navigation system that interacts with several active transmitting beacons or passive reflective beacons at corresponding known fixed locations. A vehicle-mounted receiver of the laser navigation system or radio frequency navigation system may determine the time of arrival, the angle of arrival, or both of electromagnetic signals (e.g., optical, infra-red or radio frequency) propagating from three or more beacons to determine location data for the vehicle as the vehicle moves throughout the mapped area. The navigation system 10 provides location data of the vehicle with respect to a reference location or in terms of absolute coordinates with a desired degree of accuracy (e.g., a tolerance within a range of plus or minus 2 centimeters to plus or minus 10 centimeters from the actual true location of the vehicle).

In one embodiment, the vehicular controller 14 comprises a path planner 16, a vehicular guidance module 18, and an obstacle detection/avoidance module 20. The path planner 16 is capable of planning a path of a vehicle based on input data and operator input via a user interface 24. The user interface 24 may comprise one or more of the following: a keypad, a keyboard, a display, a pointing device (e.g., a mouse), and a graphical user interface 24. The user interface 24 is shown in dashed lines to indicate that it is optional and may be disconnected from the path planner 16 or vehicular controller 14 during normal operation of the vehicle once the preferential path plan is established or otherwise provided to the path planner 16.

The vehicular guidance module 18 guides the vehicle based on the planned path established by the path planner 16 or otherwise provided if an operator or user authorizes or activates the vehicular guidance module 18 to control operation of the vehicle. In one embodiment, the vehicular guidance module 18 facilitates operation of the vehicle in compliance with one or more suitable modes of operation.

The vehicular guidance module 18 may control or provide control signals to at least one of a propulsion system 26, a braking system 28, a steering system 30, and an implement system 72 of the vehicle generally consistent with the path plan of the path planner 16, navigation input from the navigation system 10 and sensor input from one or more sensors 12, unless the path plan is overridden by the operator, by the vehicular controller 14, by the obstacle detection/avoidance module 20 by the mode selector 22 or by another control agent of the vehicle. For example, the vehicular guidance module 18 may receive input from the obstacle detection/avoidance module 20 that results in the vehicular guidance module 18, the obstacle detection/avoidance module 20, or both controlling to at least one of a propulsion system 26, a braking system 28, a steering system 30, and an implement system 72 to avoid striking an obstacle or to avoid intruding into a predetermined no-entry or safety zone around the obstacle.

One or more sensors 12 are used for detecting one or more of the following items: (1) the presence of defined or undefined physical structures through pattern recognition or otherwise, (2) the boundaries of the mapped area and/or map object through optical or tactile sensing, (3) the presence of an obstacle that obstructs the planned path of the vehicle through ultrasonic sensors or otherwise, (4) the presence of people or animals, and (5) environmental conditions associated with the vehicle or its operation if the vehicle is operating an autonomous mode or a semi-autonomous mode. Environmental conditions may include data on temperature, tilt, attitude, elevation, relative humidity, light level or other parameters.

In one embodiment, the mode selector 22 supports the selection of at least one of a first mode, a second mode, and a third mode based upon the operator input. For example, the first mode comprises an automatic steering mode, the second mode comprises a manual operator-driven mode, and the third mode comprises an autonomous mode. In a first mode, the vehicular guidance module 18 may control at least one of the propulsion system 26, braking system 28, steering system 30, and the implement system while also allowing an operator to over-ride the automatic control of the vehicle provided by the vehicular guidance module 18 at any time during operation of the vehicle. Accordingly, if an operator interacts or commands at least one of the propulsion system 26, the braking system 28, and the steering system 30 during the first mode, the mode selector 22 may automatically switch from the first mode to the second mode to allow the operator virtually instantaneous control over the vehicle. In a second mode, an operator of the vehicle commands or activates at least one of a propulsion system 26, a braking system 28, a steering system 30, and an implement system 72 of the vehicle. In a third mode, the vehicular guidance module 18 is adapted to guide the vehicle based upon the planned path and the detection of the presence of the obstacle. Although the vehicle may have three modes of operation as explained herein, in an alternate embodiment, the vehicle may have any number of modes, including at least one autonomous or semi-autonomous mode. An autonomous mode is where the vehicle has sensors 12 and control systems that allow the vehicle to complete a predefined mission and to deviate from the mission to provide for safety compliance and acceptable interaction with the environment around the vehicle.

Figure 2:
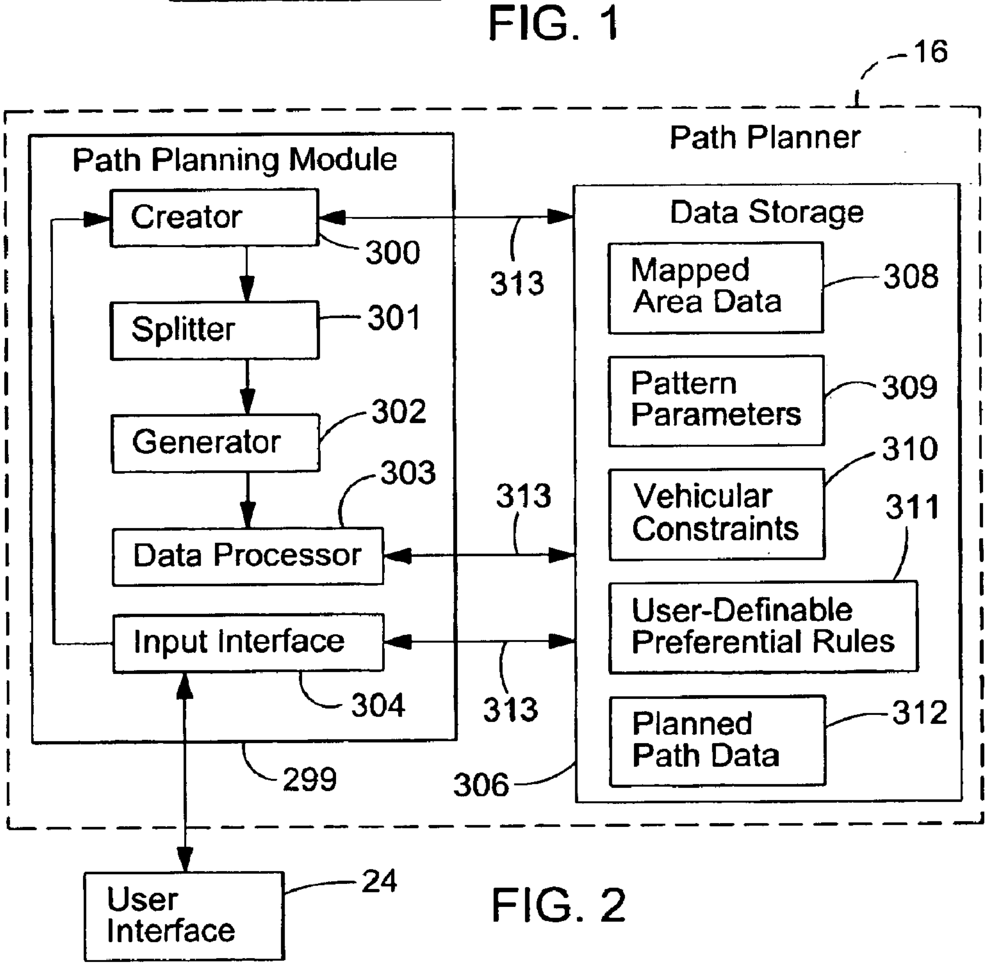
FIG. 2 is a block diagram that shows one possible illustrative embodiment of a path planner in accordance with the invention.

FIG. 2 shows an illustrative embodiment of a path planner 16 in greater detail than FIG. 1. The path planner 16 comprises a path planning module 299 that communicates with data storage 306 via one or more data paths 313. The data paths of FIG. 2 may represent logical data paths, physical data paths, or both.

The path planning module 299 may comprise an input interface 304 that supports the user interface 24 so that a user (e.g., operator of a vehicle) may enter or input data associated with path planning to establish a desired path plan or planned path data 312. In one embodiment, the path planning module 299 further comprises a creator 300 for receiving data from the input interface 304. The creator 300 may communicate with a splitter 301. In turn, the splitter 301 may communicate with a generator 302. The generator 302 may communicate with a data processor 303.

The creator 300 is adapted to create a travel row transparency over a mapped area. The mapped area may represent the work area of a vehicle. For example, the mapped area may include a desired portion or map object to be covered, treated, harvested, sprayed, mowed or otherwise processed by the vehicle or an implement thereof. The creator may obtain a definition of the mapped area from the data storage 306, a user interface 24 or both. The splitter 301 splits or divides the travel rows into travel row sections defined by intersecting the travel row with a map object or boundary.

The generator 302 generates partition nodes based upon the travel row sections. In one embodiment, each partition node is associated with a node identifier that may be assigned to distinguish one partition node from another.

The data processor 303 determines an efficient order or sequence of the partition nodes based upon the mapped area data 308, defined pattern parameters 309, established vehicular constraints 310, and established user-definable preferential rules 311, which may be obtained from accessing the data storage 306. Further, the data processor 303 generates or supports generation of a planned path by looping through the ordered partition nodes or drivable path portions (e.g., edges) interconnecting the partition nodes in the determined efficient order. Once the data processor 303 generates a planned path (e.g., a preferential planned path), the planned path data associated therewith may be stored in the data storage 306 for future reference by the path planner 16.

Figure 3:
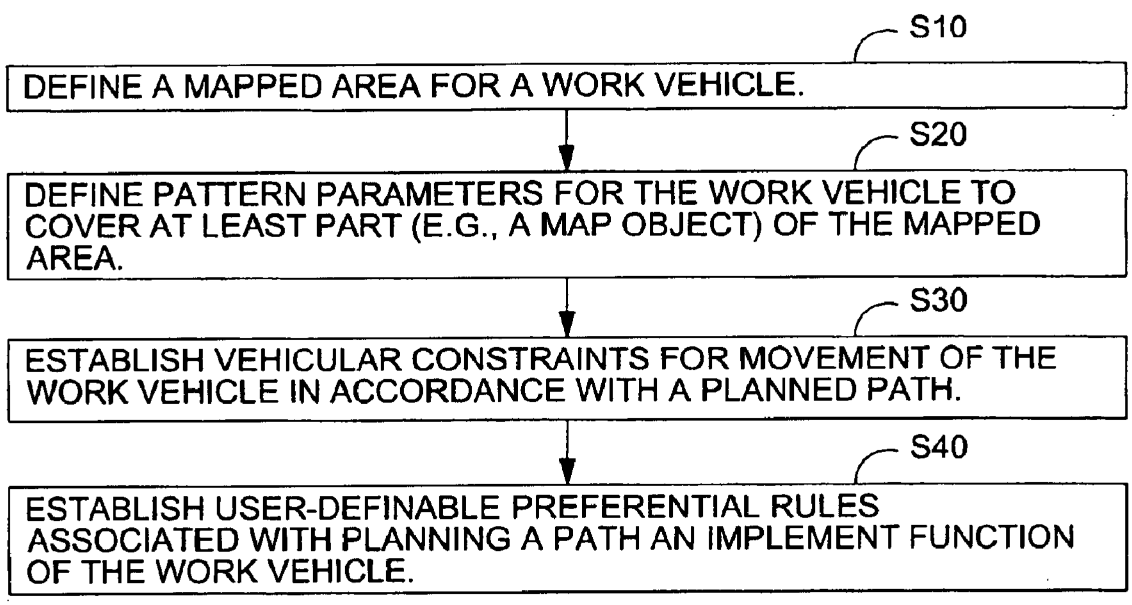
FIG. 3 is a flow chart of a method for establishing a framework of input data for path planning.

FIG. 3 shows a method for gathering input data for planning a path of a work vehicle. The method of FIG. 3 begins in step S10.

In step S10, a mapped area is defined for a work vehicle. In one example, the mapped area includes a baseball stadium. The boundaries of the baseball stadium may be defined by local coordinates of the outfield, local coordinates of the right foul area, and local coordinates of the left foul area. For example, the mapped area may be defined by traversing a boundary of the mapped area or a boundary of a map object within the mapped area with a navigation system 10 of the vehicle and recording location data for the boundary or perimeter of the mapped area, the map object, or both.

In step S20, pattern parameters are defined for the work vehicle to cover at least part (e.g., map object) of the mapped area. The pattern parameters may represent a desired pattern or pattern contribution comprising one or more of the following: a pattern shape, pattern velocity, and pattern directional constraints. Pattern shapes may include any of the following shapes: generally spiral, generally contour, generally linear, generally boustrophedon and back-and-forth straight sweep. Boustrophedon refers to a movement pattern in which the vehicle moves in opposite directions in adjacent rows that are generally parallel to one another. The desired velocity may include the desired velocity on the straight segments, the desired velocity on curved (e.g., semi-circular or circular) segments of the path, or both.

Pattern parameters for the travel path of the vehicle include one or more of the following: (1) whether or not alternate vehicular directions for adjacent parallel rows are permitted, (2) whether or not the same vehicular directions for adjacent parallel rows are permitted, (3) whether or not to stripe the grass, turf, or vegetation in a mapped area or a portion thereof by alternating the vehicular direction for adjacent groups, where each group includes two or more adjacent parallel rows mowed in the same direction, (4) whether or not to complete a back and forth straight sweep in conformance with a particular row direction and target line, (5) whether to complete a contour path in conformance with a target contour, (6) under what circumstances is crossing of a previous path permitted by the vehicle (e.g., must the implement system or mowing blades be stopped or deactivated where the vehicle is a mower), (7) what degree of overlap is required for adjacent sweeps or rows for mowing grass or vegetation, and (8) whether the vehicular path can deviate from a continuous loop.

In step S30, vehicular constraints are established. The vehicular constraints pertain the limitations or capabilities for movement of the work vehicle in accordance with planned path. The vehicular constraints may comprise a vehicular width, a minimum turning radius, an initial vehicular position, an initial vehicular heading, and other specifications of the vehicle or an implement associated therewith. The vehicular constraints may also include the weight of the vehicle, the fuel consumption of the vehicle, the horsepower of the vehicle, the maximum speed of the vehicle, the minimum speed of the vehicle or other considerations.

In step S40, one or more user-definable preferential rules are established. The user-definable preferential rules are associated with planning of a path and implementing of at least one function of a work vehicle. The user-definable preferential rules may pertain to the mapped area, another work area, vehicular characteristics, implement characteristics or other factors related to the vehicle, the mapped area or operator preferences. The user-definable preferential rules may overlap in subject matter with the pattern parameters, and the user-definable preferential rules or the pattern parameters may govern depending upon the programming of the vehicular controller 14, for example.

Although the work vehicle and the preferential rules may be defined for work vehicles other than mowers and for mapped areas other than baseball stadiums, in one illustrative embodiment, the output of the algorithm is a path that adheres to the following rules associated with a mower and a baseball stadium:

1) The path is drivable by the vehicle (e.g., mower);
2) Substantially the entire outfield of the baseball stadium must be mowed;
3) The mowed area must be striped for visual purposes;
4) No turns are allowed on the outfield grass;
5) No mowing is permitted in the right and left foul areas;
6) Minimal turning is desired in right and left foul areas;
7) The reels (e.g., of the mower) or other cutting blades must be lifted when leaving the outfield; and
8) The reels (e.g., of the mower) or other cutting blades must be lowered and turned on or rotating when entering the outfield. The data input collected in one or more of steps S10, S20, S30, and S40 may be used as input to the path planner 16 in conjunction with the method of FIG. 4.

Figure 4:
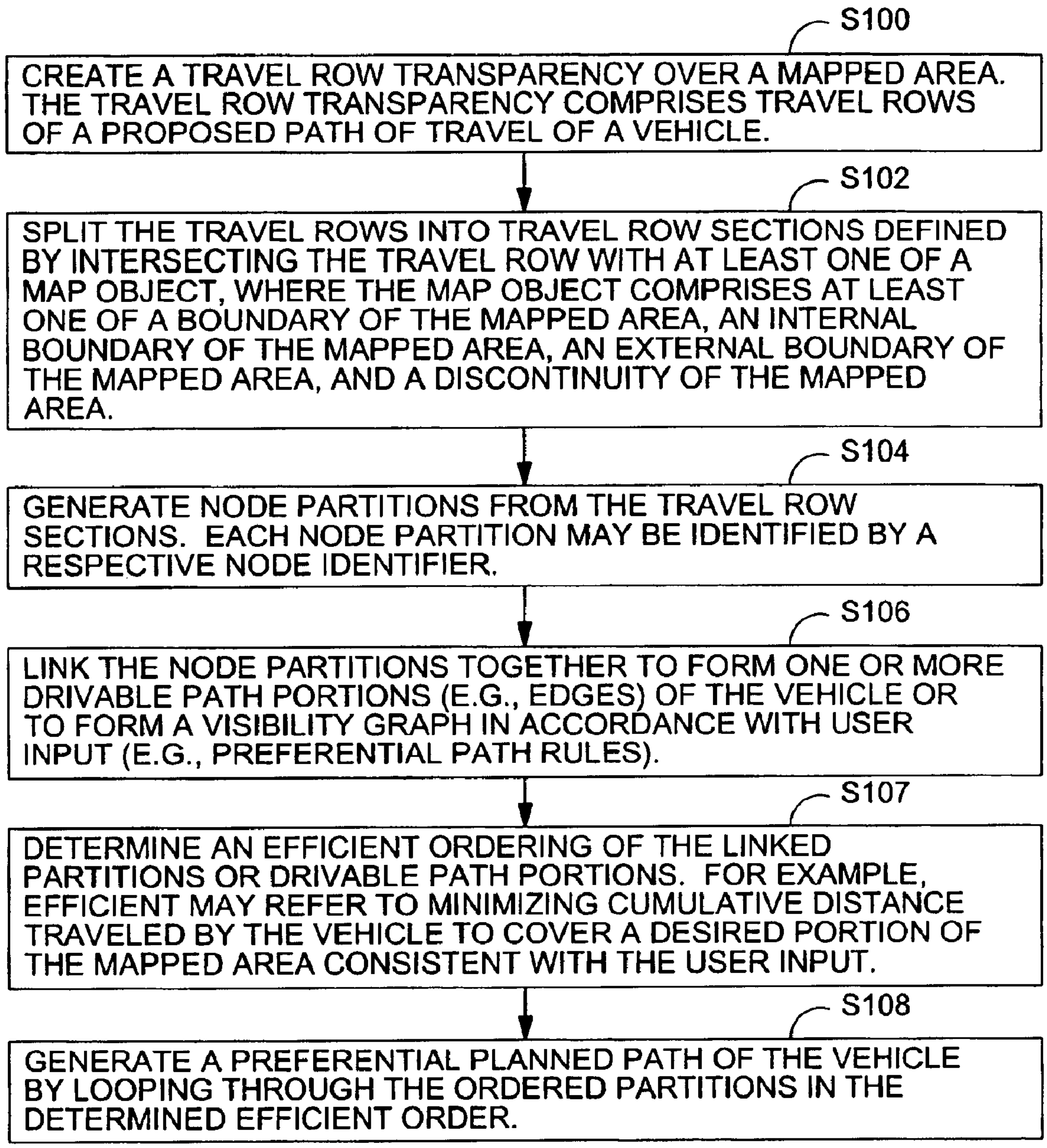
FIG. 4 is a flow chart of a method for path planning that may apply the input data gathered in the method of FIG. 3.

FIG. 4 shows a method of planning a path (e.g., preferential path plan) for a work vehicle, such as a mower or a stadium mower. The method of FIG. 4 begins in step S100.

In step S100, the path planner 16 or creator 300 creates a travel row transparency over a mapped area. The travel row transparency comprises one or more travel rows of a proposed travel path of a vehicle. For example, a series of generally straight parallel lines is generated representing travel rows of the vehicle in a specified direction and generally covering the mapped area. Further, step S100 may include defining a target line or target axis and contouring line segments that make up the target line over the mapped area to produce the transparency. The travel rows of the transparency may extend beyond map objects associated with the mapped area.

In one embodiment, the mapped area or a map object therein may comprise an arena or sports stadium, such as a baseball stadium. An outfield of a baseball stadium may be defined as the map object, the mapped area, or both, by obtaining at least one of local coordinates of an outfield, local coordinates or the right foul area, and local coordinates of the left foul area, for example.

In step S102, the path planner 16 or splitter 301 splits the travel rows into travel row sections defined by intersecting the travel row with a map object (e.g., a boundary of mapped area) or otherwise forms the travel row sections. The map object comprises at least one of a boundary of the mapped area, an internal boundary of the mapped area, an external boundary of the mapped area, and a discontinuity within the mapped area. An external boundary of a mapped area represents an external perimeter or periphery of the mapped area or work area. An internal boundary represents an internal perimeter bounding a discontinuous region or restricted region in the mapped area or work area. The vehicle may be prohibited from entering one or more discontinuous or restricted regions, which may be coextensive with obstacles or hazards, for example.

In one example, the splitting of step S102 comprises dividing travel rows of the travel row transparency into travel row sections associated with one or more intersections of a respective travel row with a corresponding map object. A first and an Nth section of a travel row generally extend past the map object, where N equals any odd whole number equal to or greater than three. Each even section of the travel row indicates a section that the vehicle must track starting with the second section on to the Mth section of the travel row, where M=N−1 and where N equals any odd whole number equal to or greater than three and depends upon the geometry of the map object.

In step S104, partition nodes (e.g., primitive partitions) from the travel row sections are generated. A partition node is defined at the intersection or near the adjacent termination points of two travel row sections if (1) a starting point and an end point of the adjacent travel row sections are adjacent to each other, which means there are no intervening travel rows between the two travel row sections, and (2) the starting point and the end points of the adjacent travel row sections lie on the same map object or boundary.

Each partition node may be assigned a unique node identifier to distinguish all nodes from each other. The node identifiers may be selected based on the relative or absolute coordinates or position of the nodes, but may be selected and assigned on any other basis, including selection from a defined set of numbers or alphanumeric characters. Partition nodes may be generated from travel row sections that comply with certain conditions.

In step S106, the partition nodes are linked together by connecting nodes to form drivable path portions, a visibility graph or both consistent with user input and vehicular constraints. In one embodiment, the linking comprises defining a list of paired partition node identifiers. A drivable path portion links two partition nodes if there is a drivable path that links the two nodes together, subject to other possible conditions. The drivable path portion may represent one or more of the following: an edge, a generally linear path segment, a generally curved path segment, a generally arched path segment, and a generally semi-circular path segment.

In one example of carrying out step S106, the drivable path portions comprise edges. Accordingly, an edge links two partition nodes if a drivable path exists, subject to compliance with other conditions of user input. An edge may be identified by a unique edge identifier. The edge identifier may be associated with paired node identifiers, or an edge identifier may be assigned in accordance with other techniques. In one embodiment, the edge may be susceptible to pattern parameters, user-definable preferential rules or both. For example, the edge may be prohibited from crossing the outfield on a diagonal path to connect two partition nodes across another edge, even if a drivable path otherwise exists between two partition nodes.

The path planner 16 or data processor 303 uses a graph-based approach, which may be expressed in as graphical, tabular or mathematical representations. A graph is made up of nodes and edges. Nodes are "choice points" in the graph; and edges connect the nodes together. The visibility graph is the graph of nodes and edges that represents many or all of the possible solutions for a preferential path of the vehicle that covers the mapped area or a desired portion thereof, consistent with user input (e.g., user input of FIG. 3).

In step S107, an efficient ordering of the partition nodes or drivable path portions (e.g., edges) are determined consistent with the user input. The ordered partition nodes may be defined by a sequential list or ranking of partition nodes or corresponding partition nodes identifiers. Similarly, the sequence of drivable path portions may be defined by a sequential list or ranking of edges or corresponding edge identifiers. To carry out step S107, for example, a search algorithm associated with the data processor 303 may search through the established visibility graph (e.g., a graphical representation, mathematical representation or another representation of many or all possible solutions) to determine which solution is optimal or preferential to accomplish one or more of the following objectives: (1) to minimize energy expenditure of the vehicle for completion of a work task (e.g., mowing, harvesting, etc.) in the mapped area, (2) to minimize work time for completing a work task in the mapped area, (3) to minimize the total distance of the traveled route of the vehicle to fully cover a desired portion (e.g., the entire portion) of the mapped area without significant overlap of the vehicular route, and (4) to meet another target performance objective for a vehicle performing work or another function in the mapped area. Further, in addition to achieving at least one of the foregoing objectives, the efficient ordering of the partition nodes are determined consistent with one or more of the following user inputs: (a) complying with any applicable user-definable preferential rules, (b) complying with vehicular constraints, (c) complying with any applicable pattern parameters, and (d) complying with applicable boundary conditions associated with the mapped area, as previously described in conjunction with FIG. 3.

Step S107 may be carried out in accordance with several techniques that may be employed cumulatively or in the alternative. In accordance with a first technique, efficient ordering refers to minimizing the cumulative distance traveled by the vehicle to cover a desired portion of the mapped area consistent with the user input. In accordance with a second technique, the efficient ordering is determined based on minimizing or reducing the energy consumption of the vehicle to complete a work task in the mapped area. Accordingly, a respective energy expenditure or rating may be associated with each partition node solution or a statistically viable solution set of the visibility path to determine the optimal solution for ordering of the partition nodes. For instance, the determining comprises using a bounded search algorithm to determine an efficient order of the partition nodes, where a search is used to identify preferential solution compliant with a efficiency objective for covering of a mapped area. In accordance with a third technique, the efficient ordering is determined based on adherence to a set of path rules, including that a path is drivable by the vehicle based on vehicular constraints, including at least vehicle width, minimum vehicular turning radius, initial vehicular position, and initial vehicular heading. In accordance with a fourth technique, the efficient ordering is determined based on adherence to a set of path rules, including compliance with a user-definable pattern parameter selected from the group consisting of traversing adjacent travel rows in opposite directions, traversing intra-group rows of travel rows in the same direction and inter-group travel rows in opposite directions, back-and-forth straight sweep of the travel rows, row direction rules, parallel tracking of target contour, and parallel tracking of a target line.

In step S108, the path planner 16 generates a preferential path by looping through the ordered partition nodes or the sequential edges in the determined efficient order, which was determined in step S107. The preferential path may include planned path data 312 that is stored in data storage 306 for later reference by the vehicular guidance module 18 or other components of the vehicular controller 14. In one embodiment, the path planner 16 generates the preferential path of the vehicle by looping through at least one of the following: (1) the ordered partition nodes, (2) ordered pairs of partition nodes or (3) a sequence of edges that were established pursuant to step S107. The partition nodes or the edges may be interconnected by curved vehicular travel path segments that fall outside of the map object or outside of a desired portion to be covered or treated within the mapped area. The curved vehicular travel path segments have curve radii or curve diameters that are consistent with the vehicular constraints of the vehicle. Each subsequent partition node is connected the next successive partition node via a drivable path portion (e.g., an edge or a curved vehicular path segment), as required for compliance with the user input, and so forth, until the last partition node has been processed.

Figure 5:
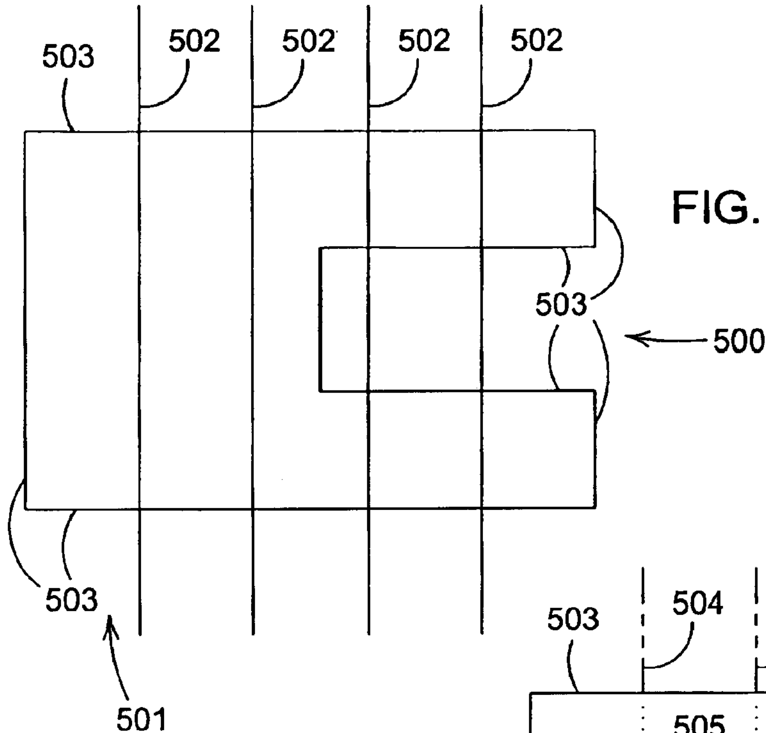
FIG. 5 represents an example of a travel row transparency, consistent with the method of FIG. 4.

FIG. 5 represents an example of a travel row transparency 500, consistent with the method of FIG. 4. The method of FIG. 4 may create the illustrative travel row transparency 500 of FIG. 5 or another travel row transparency, pursuant to step S100 of FIG. 4, for example. The travel row transparency 500 comprises a map object 501 and a series of generally parallel travel rows 502 superimposed over the map object 501 in a mapped area. Although the map object 501 has a generally polygonal shape with generally straight rectilinear boundaries 503, in alternate embodiment, the map object may have virtually any shape. As shown, four illustrative travel rows 502 are parallel to each other and extend beyond the map object 501.

Figure 6:
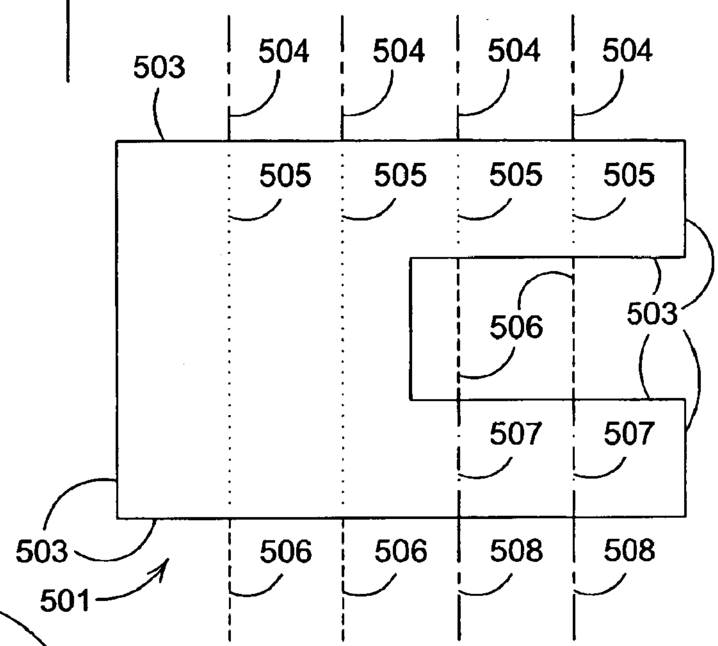
FIG. 6 represents illustrative travel row sections, consistent with the method of FIG. 4.

FIG. 6 represents illustrative travel row sections, consistent with the method of FIG. 4. The method of FIG. 4 may form the illustrative travel row sections (504, 505, 506, 507, and 508) of FIG. 6 or other travel row sections, pursuant to step S102 of FIG. 4, for example. As shown in FIG. 6, each of the two leftmost travel rows comprises three travel row sections (labeled 504, 505, 506), whereas the two rightmost travel rows comprise five travel row sections (labeled 504, 505, 506, 507, and 508). Each travel row section is shown as a unique line pattern in FIG. 6 for clarity. For example, some travel row sections 504 are shown as lines, where each line is interrupted by two adjacent short dashes; some travel row sections 505 are shown as dotted lines; other travel row sections 506 are shown as dashed lines; still other travel row sections 507 are shown as alternating dot-dash lines; and still other travel row sections 508 are shown as lines, where each line is interrupted by a single short dash.

Figure 7:
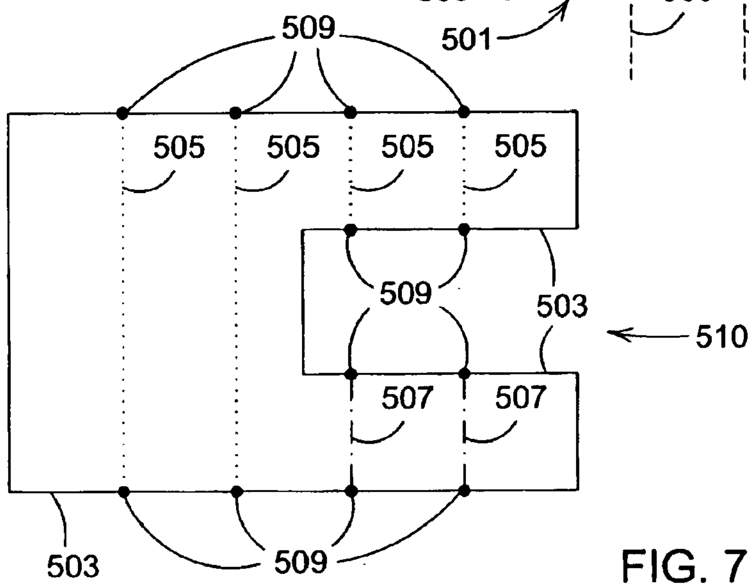
FIG. 7 represents illustrative node partitions, consistent with the method of FIG. 4.

FIG. 7 represents illustrative node partitions consistent with the method of FIG. 4. The method of FIG. 4 may generate node partitions 509 of FIG. 7 or other node partitions, pursuant to step S104 of FIG. 4, for example. Each of the node partitions 509 is indicated by a dot that is coextensive with the termination of a travel row section (e.g., 505 or 507) and the boundary 503 of the map object 501. The straight or generally linear travel row sections (e.g., 505 and 507) that interconnect the partition nodes 509 are designated as edges throughout this document. The node partitions 509 together with the edges represent one possible visibility graph 510, although other visibility graphs may be formed in accordance with the invention and fall within the scope of the claims.

Figure 8:
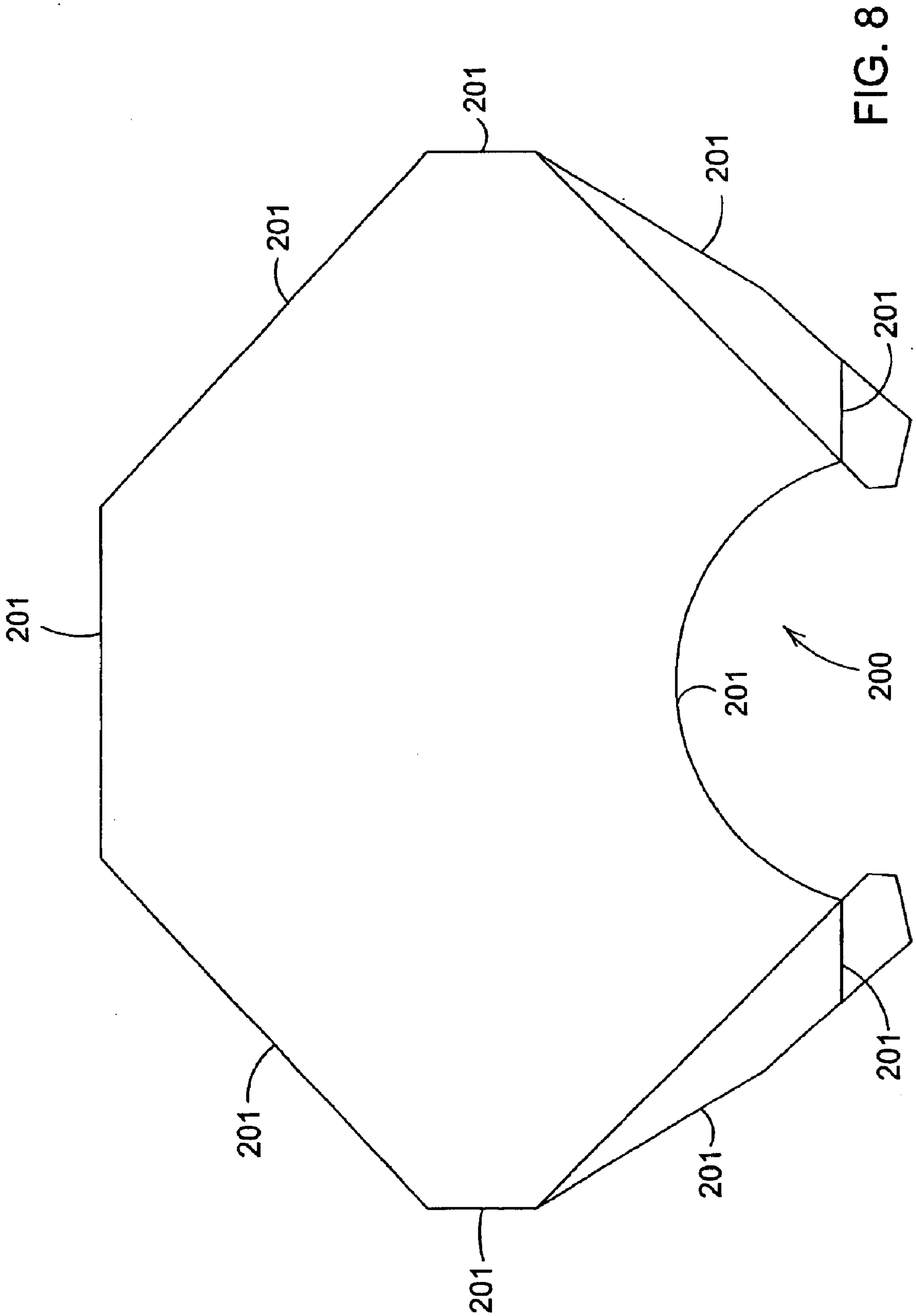
FIG. 8 is a diagram of an illustrative mapped area, such as a baseball stadium outfield.

FIG. 8 shows an exemplary mapped area that contains a representation of a baseball stadium outfield 200 as a map object. The baseball stadium outfield 200 has boundaries 201 consistent with a generally polygonal region or a generally diamond-shaped region. Although FIG. 8 shows an illustrative baseball stadium as the map object within the mapped area, the path planning of any embodiment of this invention may be used to determine the path of a work vehicle for another type of stadium, or any industrial, manufacturing, commercial, corporate, residential, governmental or agricultural work area.

Figure 9:
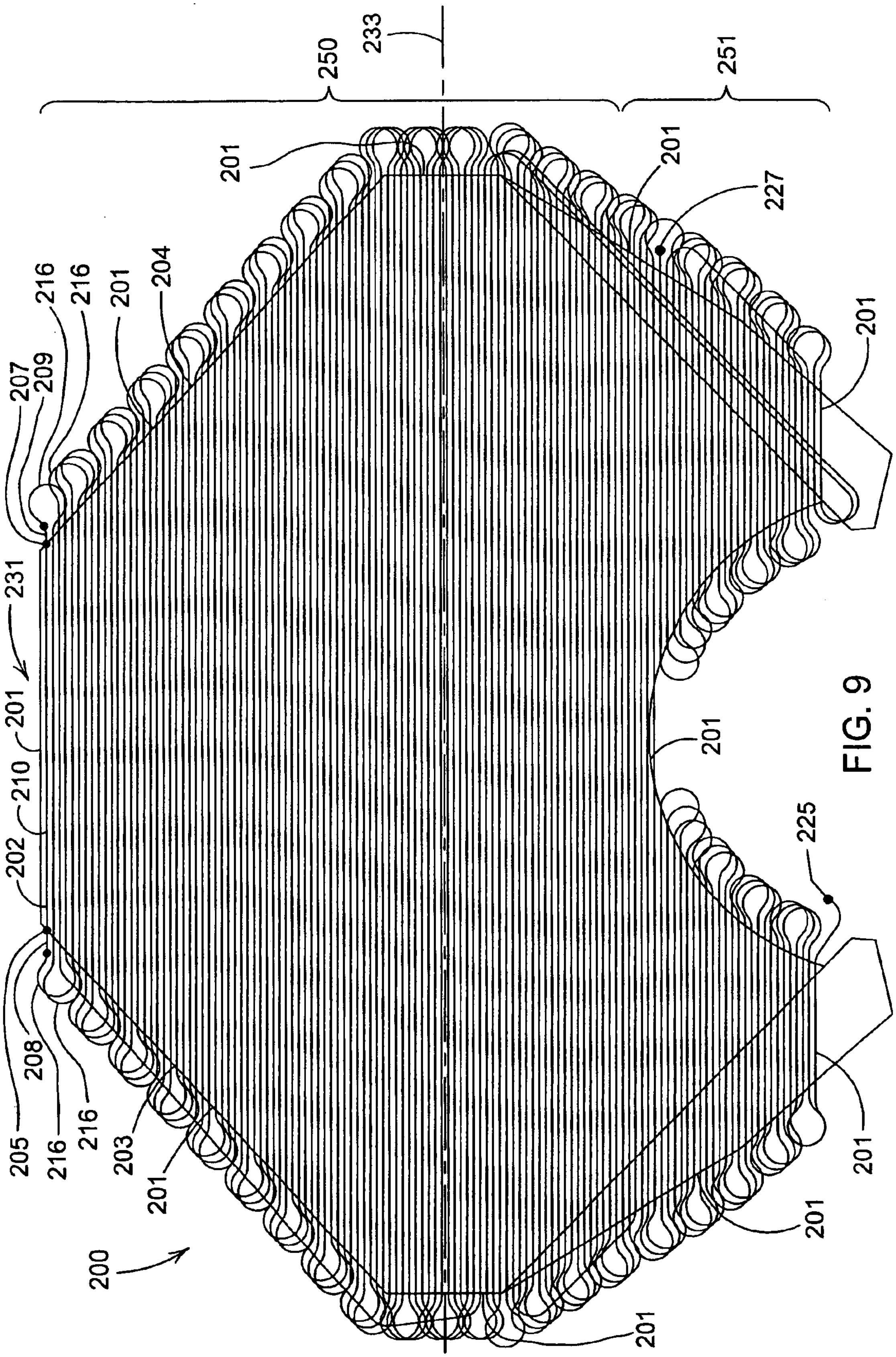
FIG. 9 is an illustrative mapped area showing an exemplary preferential planned path of a work vehicle, such as a mower for mowing grass or other vegetation.

FIG. 9 represents a preferential planned path 231 that may be established in accordance with the method of FIG. 4 with reference to the illustrative baseball stadium outfield 200 of FIG. 8. However, it is understood that the method of FIG. 4 may be used to establish preferential planned paths for other mapped area and map objects. Like reference numbers in FIG. 8 and FIG. 9 indicate like elements.

The illustrative preferential planned path 231 of FIG. 9 may be based upon one or more of the following: selected pattern parameters 309, established vehicular constraints 310, user-definable preferential rules 311, and the mapped area (e.g., the map object). The preferential planned path 231 is a generally continuous path for the vehicle that has a first termination point 225 and a second termination point 227. The first termination point 225 or the second termination point 227 may represent the beginning point of the preferential path for the vehicle, and the remaining termination point may then represent the end point of the preferential planned path 231. The preferential planned path 231 comprises a series of generally parallel lines or rows that are aligned parallel to a major axis 233 of the field or map object for visual effect or aesthetic appearance of the mowed grass.

The preferential path plan 231 illustrated in FIG. 9 comprises an upper region 250 and a lower region 251 with different path patterns (e.g., mowing patterns), although the entire preferential path plan may be uniform in alternate embodiments or otherwise allocated into different regions or zones. In the upper region 250, each row traversed by the vehicle is generally parallel and linear with respect to a previous row or pass of the vehicle across a desired portion of the mapped area. Pursuant to the preferential path plan 231, each traversed row (e.g., each mowed row) is initially separated by two intervening, untraversed rows (e.g., two unmowed rows). The two intervening, untraversed rows represent two inchoate intervening passes of the vehicle that have a width of two rows. The vehicle moves in opposite directions by a loop or curved segment that interconnects the generally linear traversed rows, while changing (i.e., reversing) the direction of travel of the vehicle and initially skipping the intervening, untraversed rows, to maintain vehicular speed and momentum (or another measure of efficiency) consistent with a minimum turning radius of the vehicle. Eventually, the sets of two untraversed rows are subsequently completed (e.g., mowed) and traversed by the vehicle such that any two adjacent, generally parallel rows of the preferential planned path in the first region 250 is traversed in opposite directions to attain a generally uniform appearance of the mowed or cut grass, sports turf, lawn or other vegetation. The sets of untraversed rows are serviced by a loop or curved segment of the same general radius as that which previously serviced the traversed rows, but offset therefrom, to maintain vehicular speed and momentum consistent with a minimum turning radius of the vehicle.

In the lower region 251, a striping effect may be obtained by mowing groups (e.g., groups of three) of adjacent rows in opposite directions in an alternating fashion to achieve the desired visual effect or aesthetic appearance. The groups of the adjacent rows mowed in the same direction would determine the width of such "striped" strips of the grass, lawn, stadium, sports turf or other vegetation mowed by the vehicle.

As illustrated in FIG. 9, an uppermost travel row 202 extends beyond a first generally linear boundary 203 and a second generally linear boundary 204. The first generally linear boundary 203 and the second generally linear boundary 204 represent different sides (e.g., opposite sides) of the generally polygonal region formed by the map object.

At the intersection of the map object and the uppermost travel row 202, a first partition node 205 and a second partition node 207 are found. The portion of the uppermost travel row 202 to the left of the first boundary 203 is designated the first travel row section 208. The portion of the uppermost travel row 202 between the first and second nodes (205, 207) is referred to as the second travel row section 210. The portion of the uppermost travel row 202 to the right of the second boundary 204 is designated the third travel row section 209. Additional partition nodes 214 may be spaced apart from the first partition node 205 on the first generally linear boundary 203. Similarly, additional partition nodes 214 may be spaced apart from the second partition node 207 on the second generally linear boundary 204. The additional nodes and the first and second nodes (205, 207) may be interconnected by loops 216 in an efficient order for movement of the vehicle in the mapped area of the outfield 200.

Figure 10:
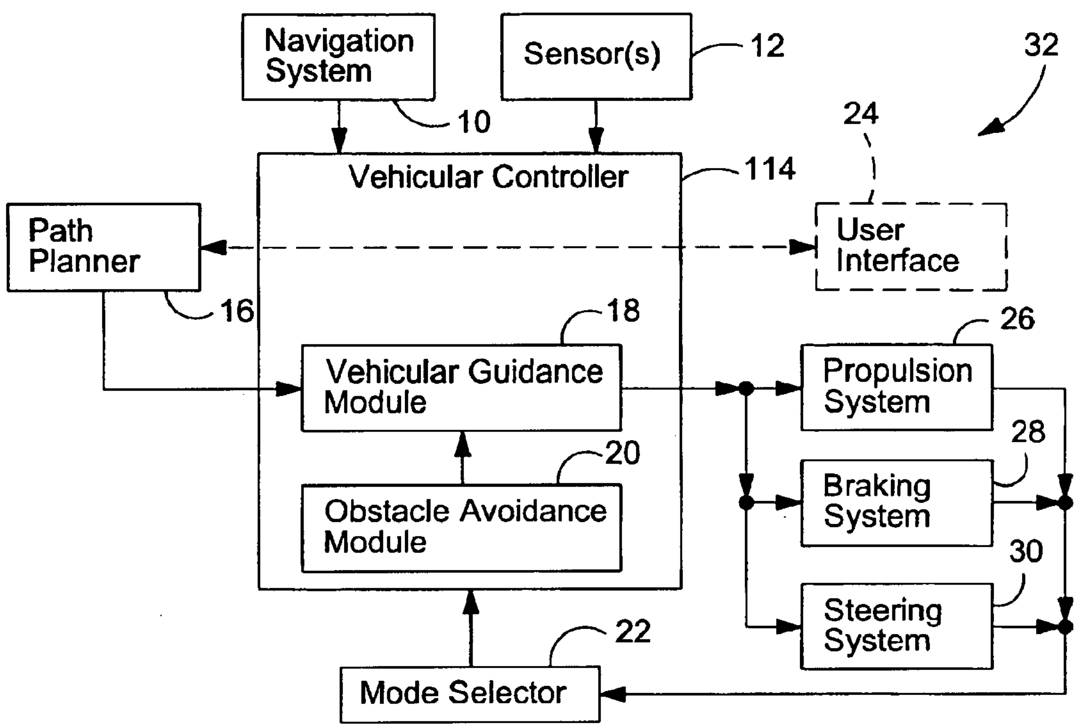
FIG. 10 is a block diagram of an alternate embodiment of a vehicular control system that may incorporate or support a path planning of this invention.

FIG. 10 is a block diagram of a vehicular control system that is similar to that of FIG. 1, except the vehicular controller 114 of FIG. 10 excludes the path planner 16 integrated therein. Rather, the path planner 16 of FIG. 10 is configured separately from the vehicular controller 114, but the path planner 16 and the vehicular controller 114 of FIG. 10 collectively perform the same functions as the vehicular controller 14 and the path planner 16 of FIG. 1. Like reference numbers in FIG. 1 and FIG. 10 indicate like elements.

Work vehicles that safely adhere to a planned path may be used to eliminate or reduce the exposure of a human operator to chemicals, fertilizer, herbicides, insecticides, dust, allergens, exhaust fumes, environmental conditions, slopes, low-hanging branches, and other hazards that might be harmful or irritating to an operator. Further, the planned path of a work vehicle may be completed with precision which equals or exceeds that of a human operator to obtain a desired aesthetic appearance.

Having described the preferred embodiment, it will become apparent that various modifications can be made without departing from the scope of the invention as defined in the accompanying claims.

What is claimed is:

1. A method of planning a path comprising:

creating a travel row transparency over a mapped area, the travel row transparency comprising a representation of a group of generally parallel travel rows;

splitting the travel rows into travel row sections defined by intersecting the travel rows of the travel row transparency with a map object or boundary;

generating partition nodes associated with ends of the travel row sections;

linking the partition nodes together to build at least one of a drivable path portion and a visibility graph;

determining an efficient order of the partition nodes consistent with at least one of a user-definable preferential rule and a pattern parameter for imparting a desired aesthetic appearance to at least a portion of the mapped area; and generating a preferential path by looping through or interconnecting the ordered partition nodes in the determined efficient order.

2. The method according to claim 1 further comprising defining a baseball stadium as a map object in the mapped area by obtaining at least one of local coordinates of an outfield, local coordinates of a right foul area, and local coordinates of a left foul area.

3. The method according to claim 1 wherein the efficient order is determined based on adherence to a set of path rules, including that path is drivable by the vehicle based on vehicular constraints, including at least vehicle width, minimum vehicular turning radius, initial vehicular position, and initial vehicular heading.

4. The method according to claim 1 wherein the efficient order is determined based on adherence to a set of path rules, including compliance with a user-definable pattern parameter as the pattern parameter, the user-definable pattern parameter selected from the group consisting of traversing adjacent travel rows in opposite directions, traversing intragroup rows of travel rows in the same direction and intergroup travel rows in opposite directions, back-and-forth straight sweep of the travel rows, row direction rules, parallel tracking of target contour, and parallel tracking of a target line.

5. The method according to claim 1 wherein the creating comprises generating a series of straight parallel lines representing travel rows of the vehicle in a specified direction and generally covering a desired portion of the mapped area.

6. The method according to claim 1 wherein the creating comprises:

defining a target contour superimposed over a map object in the mapped area; and forming parallel segments with respect to the target contour over the mapped area to produce the transparency, the parallel segments and the target contour extending beyond the map object.

7. The method according to claim 1 wherein the splitting comprises dividing travel rows of the travel row transparency into travel row sections associated with one or more intersections of a respective travel row with a corresponding map object.

8. The method according to claim 7 wherein a first and an Nth section of a travel row extend past the map object, where N equals any odd whole number equal to or greater than three; each even section of the travel row indicating a section that the vehicle must track starting with the second section on to the Mth section of the travel row, where M equals N minus 1.

9. The method according to claim 1 wherein the generating the partition nodes comprise generating partition nodes from travel row sections; where two sections are in the same partition node if a starting point and end points are adjacent to each other, if there are no intervening travel rows between the two, and if their start and end points lie on the same map object.

10. The method according to claim 1 wherein the linking comprises connecting partition nodes by an edge as the drivable path portion.

11. The method according to claim 1 wherein the determining comprises using a bounded search algorithm to determine an efficient order of the partition nodes.

12. The method according to claim 1 wherein the generating comprises connecting a series of drivable path portions via curved path segments consistent with the determined efficient order from a first partition node to a last partition node.

13. The method according to claim 1 wherein each of the partition nodes is defined at an intersection or near adjacent termination points of two travel row sections if a starting point and an end point of the adjacent travel row sections are adjacent to each other, and if the starting point and the end points of the adjacent travel row sections lie on the same map object or boundary.

14. The method according to claim 1 wherein the visibility graph comprises at least one graph of the partition nodes and edges that represents possible solutions for a preferential path of the vehicle that covers the mapped area or a desired portion thereof.

15. The method according to claim 1 wherein determining of the efficient order is based on at least one of mapped area data, defined pattern parameters, established vehicular constraints, and established user-definable preferential rules.

16. The method according to claim 1 wherein determining of the efficient order comprises determining the efficient order of the partition nodes consistent with tracing travel row sections within the map object.

17. The method according to claim 1 wherein determining the efficient order comprises minimizing cumulative total distance to be traveled by a vehicle to cover a desired portion of the mapped area.

18. The method according to claim 1 wherein determining the efficient order comprises minimizing the cumulative total distance of a traveled route of a vehicle to fully cover a desired portion of the mapped area without significant overlap of the traveled route.

19. The method according to claim 1 wherein the desired aesthetic appearance comprises a striped visual appearance of a grass field, the grass field comprising the portion of the mapped area, and the at least one user-definable preferential rule authorizing respective directions of travel of adjacent groups travel rows for a mowing of the grass field to produce the striped visual appearance for the generated preferential path.

20. The method according to claim 19 wherein the grass field is selected from the group consisting of a baseball field, a baseball stadium, and a baseball outfield, an arena, and sports stadium.

21. The method according to claim 19 wherein the at least one user-definable preferential rule prohibits turns on a defined portion of the grass field for the generated preferential path.

22. A path planner for planning a path, the system comprising:

a creator for creating a travel row transparency over a mapped area, the travel row transparency comprising a representation of a group of generally parallel travel rows;

a splitter for splitting the travel rows into travel row sections defined by intersecting the travel rows of the travel transparency with a map object or boundary;

a generator for generating partition nodes associated with ends of the travel row sections, each partition node defined by a respective node identifier;

a data processor for determining an efficient order of the partition nodes based upon the mapped area, defined pattern parameters, established vehicular constraints, and established user-definable preferential rules and for generating a planned path by looping through or interconnecting the ordered partition nodes in the determined efficient order consistent with at least one of the user-definable preferential rules and the pattern parameters for imparting a desired aesthetic appearance to at least a portion of the mapped area.

23. The path planner according to claim 22 wherein the mapped area comprises a baseball stadium defined by at least one of local coordinates of an outfield, local coordinates of a right foul area, and local coordinates of a left foul area.

24. The path planner according to claim 22 wherein the data processor determines the efficient order based on vehicular constraints, including at least vehicle width, minimum vehicular turning radius, initial vehicular position, and initial vehicular heading.

25. The path planner according to claim 22 wherein the data processor determines the efficient order based on adherence to a set of path rules, including compliance with a user-definable pattern parameter as one of the pattern parameters, the user-definable pattern parameter selected from the group consisting of traversing adjacent travel rows in opposite directions, traversing intra-group rows of travel rows in the same direction and inter-group travel rows in opposite directions, back-and-forth straight sweep of the travel rows, row direction rules, parallel tracking of target contour, and parallel tracking of a target line.

26. The path planner according to claim 22 wherein the creator generates a series of straight parallel lines representing travel rows of the vehicle in a specified direction and generally covering the mapped area.

27. The path planner according to claim 22 wherein the desired aesthetic appearance comprises a striped visual appearance of a grass field, the grass field comprising the portion of the mapped area, and the at least one user-definable preferential rule authorizing respective directions of travel of adjacent groups travel rows for a mowing of the grass field to produce the striped visual appearance for the generated preferential path.

28. The path planner according to claim 27 wherein the grass field is selected from the group consisting of a baseball field, a baseball stadium, and a baseball outfield, an arena, and sports stadium.

29. A method of planning a path, the method comprising:

defining a group of travel row sections being generally parallel to one another and spaced apart from one another in a mapped area, each travel row section having ends or partition nodes associated with a map object or boundary;

determining an efficient order for a vehicle to traverse the partition nodes such that the associated travel row sections are traversed consistent with at least one of a user-definable preferential rule and a pattern parameter for imparting a desired aesthetic appearance to at least a portion of the mapped area; and generating a preferential path by looping through or interconnecting the ordered partition nodes in the determined efficient order.

* * * * *